(12) United States Patent
Abu-Isa

(10) Patent No.: US 7,378,463 B2
(45) Date of Patent: May 27, 2008

(54) HALOGEN-FREE FIRE RETARDANT SYSTEM FOR LOW HEAT RELEASE POLYMERS

(75) Inventor: Ismat Ali Abu-Isa, Rochester Hills, MI (US)

(73) Assignee: Enerdel, Inc., Fort Lauderdale, FL (US)

( * ) Notice: Subject to any disclaimer, the term of this patent is extended or adjusted under 35 U.S.C. 154(b) by 216 days.

(21) Appl. No.: 10/771,916

(22) Filed: Feb. 4, 2004

(65) Prior Publication Data
US 2005/0171254 A1    Aug. 4, 2005

(51) Int. Cl.
C08K 5/3492 (2006.01)
C08K 5/1515 (2006.01)
C08K 5/521 (2006.01)
C08K 3/28 (2006.01)
C08K 3/38 (2006.01)

(52) U.S. Cl. .............. 524/100; 524/101; 524/115; 524/195; 524/291; 524/404; 524/405; 524/423; 524/430; 524/449; 524/494; 252/609

(58) Field of Classification Search .............. 524/100, 524/101, 115, 195, 291, 404, 405, 423, 430, 524/449, 494; 252/609
See application file for complete search history.

(56) References Cited

U.S. PATENT DOCUMENTS

| | | | |
|---|---|---|---|
| 5,180,767 A | 1/1993 | Sakai et al. | |
| 5,204,393 A | 4/1993 | Nalepa et al. | 524/101 |
| 5,643,999 A * | 7/1997 | Lee et al. | 525/193 |
| 5,834,535 A | 11/1998 | Abu-Isa et al. | 523/179 |
| 6,184,269 B1 | 2/2001 | Abu-Isa et al. | 523/179 |
| 6,232,377 B1 | 5/2001 | Hayashi et al. | |
| 6,528,558 B2 | 3/2003 | Lewin | 524/100 |
| 6,599,963 B2 | 7/2003 | Horsey et al. | 524/100 |
| 6,632,442 B1 | 10/2003 | Chyall et al. | 424/400 |
| 2002/0155348 A1 | 10/2002 | Gitto | |
| 2003/0108700 A1 | 6/2003 | Krech et al. | |
| 2004/0059035 A1 | 3/2004 | Krech et al. | |

FOREIGN PATENT DOCUMENTS

| | | |
|---|---|---|
| EP | 1331242 | 7/2003 |
| JP | 01101346 | 4/1989 |

* cited by examiner

*Primary Examiner*—Kriellion A Sanders
(74) *Attorney, Agent, or Firm*—Howard & Howard Attorneys, P.C.

(57) ABSTRACT

An intumescent fire retardant system for making polymeric moldings that is halogen-free and provides fire shielding, thermal shielding and a low heat release rate. The intumescent fire retardant system of the present invention comprises, on the basis of 100 parts by weight blended mixture, 20-45 parts of a polymeric binder based on high density polyethylene and an α-olefin-containing copolymer, such as linear low density polyethylene, and 5-25 parts of a nitrogenous gas-generating agent, 10-30 parts of a water vapor-generating agent, 1-5 parts of an antioxidant, and 0-15 parts of a reinforcing agent. The fire retardant system of the present invention is essentially halogen-free.

18 Claims, 2 Drawing Sheets

HALOGEN-FREE FIRE RETARDANT SYSTEM FOR LOW HEAT RELEASE POLYMERS

CROSS REFERENCE TO RELATED APPLICATION

This application is related to commonly owned, U.S. patent application Ser. No. 10/771,972, filed Feb. 4, 2004, and published as Pub. No. US 2005/0170238 A1 on Aug. 4, 2005, and entitled "Fire Shielding Battery Case," the disclosure of which is incorporated herein by reference in its entirety as if completely set forth herein below.

TECHNICAL FIELD

This invention relates to an intumescent flame retardant system for moldable polymeric materials.

BACKGROUND OF THE INVENTION

Intumescent materials contain ingredients that decompose on severe heating to generate gases and form an incombustible or low combustible residue. The expelled gases expand the residue to form a foam layer with improved thermal insulation properties. Materials also having a low heat release rate are advantageous in that once they are exposed to fire they release less heat to neighboring materials and diminish fire propagation. This is important because if, for example, a fire is started in a warehouse where large quantities of materials are stored, the fire will not get out of control and will be easily extinguished when fire retardant low heat release materials are used in place of ordinary polymers. Hence, major applications for low heat release polymers are for shipping pallets and shipping containers. However, such polymers can be used wherever there are fire safety concerns. The polymers can be used for automotive applications, such as for a fire shield for fuel tanks, car floors, bulk heads, wheel well covers or in other places in cars, trucks, boats, or airplanes to provide resistance to ignition or resistance to flame travel from the fire source to other areas. Applications in residential or commercial structures could help fire containment within each structure as well as slowing down the spread of fire from one structure to a neighboring structure. Hence, fire containment is more easily accomplished when flammable substrates are substituted with low heat release fire retardant polymers. Replacement of metal parts with such polymers, in applications requiring fire integrity, would also lead to appreciable weight reduction.

Shipping pallets will be used as an example to demonstrate the advantages of using polymers with low heat release rate, though the invention is not so limited. Pallets are portable platforms used for handling, storing or moving materials and heavy packages around in a warehouse or during shipping. Pallets have been traditionally made of wood. More and more plastics are being used to replace wood for the following benefits: (1) plastics maintain consistent weight and dimensions and are easy to stack; (2) plastics will not harbor bacteria and other contaminants; (3) plastics are easy to handle and clean; (4) plastics do not rot, splinter, or corrode; (5) plastics reduce transportation and disposal costs; (6) plastics are recyclable; (7) plastics perform consistently with automated equipment; (8) plastics are safe and easy to use; (9) plastics have improved toughness and stiffness; and (10) plastics lend themselves to embedding tracking devices.

As more plastic is being used in this market to replace wood pallets, fire performance becomes a concern. Plastic pallets are being required to meet or exceed the fire resistance standards for wood pallets. The standards include requirements that the material should have low heat release rate and low flame spread rate. By way of example, polyethylene, which is the preferred material for making pallets, melts, drips and burns at a relatively fast rate when exposed to fire. On the other hand, polyethylene is strong and durable, and has a low cost, high impact resistance and high chemical resistance. Thus, flame retardant systems have been developed for use with plastics, such as polyethylene, that attempt to provide intumescence, low heat release rate and low flame spread rate without decreasing the strength, durability, and impact and chemical resistance of the plastic to unacceptable levels. The same efforts have been made in other markets were flame retardant plastic materials are desirable. Invariably, however, some loss in the physical properties of the polymeric material is experienced upon addition of inorganic flame retardant materials to the polymer matrix.

The flame retardant materials must therefore provide a desired balance between physical properties, such as impact strength, tensile strength, elongation, and elasticity, and flame retardant properties, such as flame spread control, melt dripping, smoke, peak and average heat release rate, and total heat release. By way of example, U.S. Pat. No. 5,834,535 entitled "Moldable Intumescent Polyethylene and Chlorinated Polyethylene Compositions", and U.S. Pat. No. 6,184,269 entitled "Moldable Intumescent Materials Containing Novel Silicone Elastomers" describe flame retardant plastic systems that address the need for achieving improved resistance to fire in desirable plastics without an unacceptable decrease in physical properties. However, the materials described therein contain a halogen material, namely, chlorinated polyethylene, which may generate corrosive HX gases, such as HCl. These toxic by-products are dangerous to persons exposed thereto. Many similar efforts to develop flame retardant systems utilize halogenated components because halogens are very efficient fire retardants. However, because they are environmentally unfriendly, it is desirable to find a fire retardant system that does not use halogens.

Thus, there is a need to formulate a non-halogen polymeric material that is strong and durable, that has a low cost, high impact resistance and high chemical resistance, that burns at a slow rate, that does not melt, drip and flow, and that releases a relatively low amount of heat when exposed to fire.

SUMMARY OF THE INVENTION

An intumescent fire retardant system is provided for use in making polymeric moldings that is halogen-free and provides fire shielding, thermal shielding and a low heat release rate. The fire retardant system of the present invention may be blended into many types of thermoplastic and thermoset polymers to produce fire retardant materials with good physical properties in addition to good flammability performance. To that end, the intumescent fire retardant system of the present invention comprises, on the basis of 100 parts by weight blended mixture, 20-45 parts of a polymeric binder including an α-olefin-containing copolymer, such as linear low density polyethylene copolymer, and a high density polyethylene having a density in the range of 0.940-0.970 g/cm$^3$. The fire retardant system further comprises 5-25 parts of a nitrogenous gas-generating agent, 10-30 parts of a water vapor-generating agent, 1-5 parts of an antioxidant, and 0-15 parts of a reinforcing agent. Notably, the fire retardant system of the present invention is essentially halogen-free.

The nitrogenous gas-generating agent may be an amine, urea, guanidine, guanamine, s-triazine, and/or amino acid, salts thereof, and/or mixtures thereof. The salts are advantageously phosphates, phosphonates, phosphinates, borates, cyanurates, sulfates, and mixtures thereof. Exemplary nitrogenous gas-generating agents include ammonium salt, such as ammonium phosphates, polyphosphates, pyrophosphates, and cyanurates, and melamine salts, including melamine phosphates, polyphosphates, pyrophosphates and cyanurates. Exemplary water vapor-generating agents include hydrated magnesia, intercalated graphite, hydrated alumina and mixtures thereof. Exemplary antioxidants include distearylthiodipropionate, hindered phenols, and mixtures thereof. Exemplary reinforcing agents include glass fibers, mica, titanium oxide and mixtures thereof.

BRIEF DESCRIPTION OF THE DRAWINGS

The present invention will now be described, by way of example, with reference to the accompanying drawings, in which.

DETAILED DESCRIPTION

Figure 1:
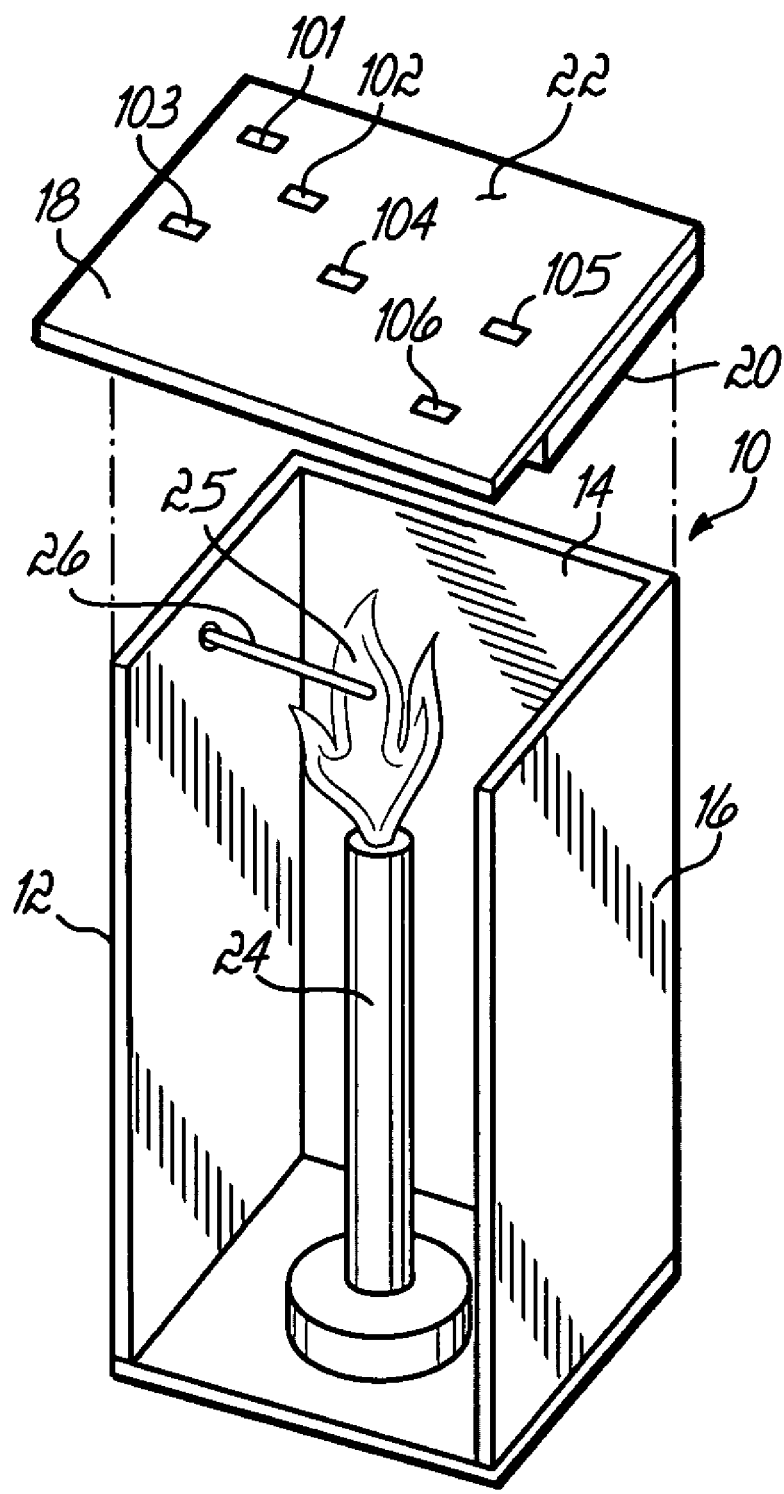
FIG. 1 is a perspective view of an apparatus for measuring the efficiency of an intumescent fire retardant polymeric composition, according to the present invention.

The present invention provides an intumescent fire retardant system that may be used by itself or that may be added to a polymeric material to produce a moldable material with good physical properties that burns at a slow rate, has a low heat release rate, and has intumescence to provide fire and heat shielding. The fire retardant system does not contain halogens, and is therefore an environmentally safer system than fire retardants that rely on halogenated components for their efficiency. The present invention further provides intumescent fire retardant polymeric compositions that are thermoplastic molding compositions that can be blow molded, injection molded, compression molded or otherwise suitably molded and shaped to a desired geometry or configuration by thermal processes. Polymeric materials produced using the fire retardant system of the present invention, and thus having low heat release rate, are advantageous in that once they are exposed to fire they release less heat to neighboring materials and diminish fire propagation.

In accordance with the present invention, compounds based on nitrogen chemistry (for example melamine cyanurate or ammonium cyanurate) or nitrogen phosphorus chemistry (such as ammonium polyphosphate or melamine pyrophosphate) can be formulated with other ingredients to produce intumescent formulations that not only are efficient as fire retardants but also are efficient in reducing the heat release rate, during burning, of polymers to which they are added. These nitrogenous gas-generating agents form 5-25 parts by weight of the fire retardant system. A combination of resins is used as a polymeric binder for the intumescent fire retardant ingredients to provide desirable physical properties for the fire retardant system and/or for the polymeric material to which the system is added. The polymeric binder forms 20-45 parts by weight of the fire retardant system.

High density polyethylene (HDPE) is used in the binder for its strength, durability, low cost, high impact resistance and high chemical resistance. An α-olefin-containing copolymer may also be used in the binder for added impact strength. In an exemplary embodiment, the fire retardant system of the present invention includes 20-45 parts by weight of HDPE and 0-15 parts by weight of the α-olefin-containing copolymer for a total polymeric binder content of 20-45 parts. The fire retardant system of the present invention further includes 10-35 parts by weight of one or more water vapor-generating agents for intumescence, 1-5 parts by weight of an antioxidant for heat stability, and optionally, up to 15 parts by weight of a reinforcing agent. The fire retardant system of the present invention may be used by itself as a moldable polymeric material, or it may be added in any desired amount, for example in an amount of 20-45 parts by weight, to a moldable polymeric material to achieve a desired balance between physical properties and flammability performance.

The HDPE constituent of the fire retardant system of the present invention has a density in the range of 0.940-0.970 g/cm$^3$. Such materials are produced using suitable known catalysts at a relatively low pressure of ethylene. HDPE assists in preventing melt dripping during a fire. HDPE is available with molecular weights ranging from a low molecular weight of about 10,000 (usually waxes) to an ultrahigh molecular weight (UHMW-HDPE) of several million. Wide variation of branching and density are also available.

Many grades of HDPE may be used in the present invention depending on the application and the method of processing. High molecular weight/high melt viscosity grades are used for blow molding applications. Low melt viscosity grades are preferred for injection molding. Extrusion is normally performed using intermediate melt viscosity. HDPE by itself may be formulated into the intumescent system, for example, in an amount of 20-45 parts by weight of the system formulation; however, the resulting polymer may have poor mechanical properties, which may be unacceptable for particular applications. Thus, a portion of the polymer binder, for example, up to 15 parts by weight of the system formulation, is advantageously an α-olefin-containing copolymer having a density less than the density of the HDPE. For example, the α-olefin-containing copolymer may be a linear low density polyethylene copolymer having a density in the range of 0.870-0.910 g/cm$^3$. Exemplary α-olefin-containing copolymers include copolymers of ethylene with one of butene, hexene and octene. The ethylene-butene, ethylene-hexene, and ethylene-octene copolymers advantageously have a density in the range of 0.870-0.910 g/cm$^3$. The ethylene-octene copolymers supplied by ExxonMobil Chemical Co. under the Exact® product line are exemplary, for example, Exact® 0210 and Exact® 8210.

The nitrogenous gas-generating agent is present in the fire retardant system of the present invention in an amount of 5-25 parts by weight. These agents generate nitrogen-containing gases in order to foam the polymeric matrix before the material is consumed by the fire. The residue that remains after burning most of the organic material will have a porous char structure and will thus be effective as a thermal barrier. The nitrogenous gas-generating agents may be any of amines, ureas, guanidines, guanamines, s-triazines, amino acids, salts thereof, and mixtures thereof. These agents emit $N_2$ gas or $NH_3$ gas when heated. Advantageously, the nitrogenous gas-generating agent is a salt, including phosphates, phosphonates, phosphinates, borates, cyanurates, sulfates, and mixtures thereof. Further advantageously, the nitrogenous gas-generating agent is one or more of phosphates, polyphosphates, pyrophosphates or cyanurates of ammonium or melamine. Thus, the nitrogenous gas-generating agent may be a nitrogen-containing compound that generates $N_2$ or $NH_3$ gas upon heating, or a nitrogen and phosphorous-containing compound that generates $N_2$ or $NH_3$ gas upon heating. The phosphorous-containing compounds may also form phosphoric acid upon heating, which will act as a catalyst to encourage char formation.

The water vapor-generating agent is present in the fire retardant system of the present invention in an amount of 5-25 parts by weight. These agents induce intumescence and cool down the fire. Hydrated magnesia is particularly effective, but hydrated alumina will also emit water vapor during burning. Intercalated graphite has also been found to induce intumescence. Intercalated graphite is produced by treating graphite with acid and then washing the acid out, leaving behind water between the crystalline layers of the graphite. Upon heating, the water expands, thereby expanding the graphite, and vaporizes to produce water vapor that cools down the fire. Thus, in an exemplary embodiment of the present invention, hydrated magnesia and intercalated graphite are used in combination to provide intumescence and a low heat release rate.

An antioxidant is included in the fire retardant system of the present invention in an amount of 1-5 parts by weight to impart thermal and oxidation stability. Although any suitably compatible stabilizer may be used with HDPE and the α-olefin-containing copolymer for protection against heat and oxygen, it has been found that a system consisting of distearylthiodipropionate (DSTDP) and a butylated reaction product of p-cresol and dicyclopentadiene (e.g., Wingstay® L) is very effective as an antioxidant. Other thio-based antioxidants and/or hindered phenol antioxidants may be used for stabilizing the intumescent material against thermal oxidation.

Optionally, the fire retardant system of the present invention may include a reinforcing agent, such as a glass fiber reinforcing filler, which is added in an amount up to 15 parts by weight to provide an increased strength in the structure of the intumescent material after burning, and to enhance the action of the system as a fire shield. The presence of 3% or higher of glass fiber reinforcing filler may be needed in some formulations to prevent the intumesced residue from being friable, which means brittle or easily broken into small fragments or reduced to powder. Advantageously, the fire retardant system includes 3-10% glass fibers. In addition to glass fibers, other reinforcing agents may be used to provide strength to the residue, including titanium dioxide and mica. A mixture of various reinforcing agents may also be used.

None of the constituents of the fire retardant system of the present invention includes a halogen. Thus, the fire retardant system of the present invention is essentially halogen-free. By essentially, we refer to the possibility that small impurity amounts of halogens may be present in the raw materials used to form the fire retardant system, but the total halogen content should be less than 0.5 parts by weight. Most advantageously, the fire retardant system will contain 0% halogen content.

The mixing of compositions described herein on a laboratory scale was achieved by different methods. The ingredients for each formulation of the composition were weighed and dry blended. Melt mixing and extrusion into a continuous rod was accomplished by using a Brabender extruder with a 20 mm barrel diameter. The extruder was designed to have three (3) heating zones on the barrel. These heating zones were controlled at temperatures ranging between 150° C. and 290° C. depending on the composition of the material being extruded. The rod die was heated to 260° C. or lower temperatures. The extruded rod was allowed to come to room temperature before pelletizing. Pellets were used to compression mold about 2 mm thick slabs. Samples for UL fire testing, fire shielding test, and for mechanical properties were cut from the compression molded samples.

Three other methods have been used for melt mixing samples in the laboratory. The first involved the use of a two roll heated mill. For an intumescent formulation based on polyethylene, the rolls were preheated to 65° C., and the resins and stabilizers were shear mixed for about five minutes. During this time, the temperature rises to about 150° C. due to shearing. The rest of the ingredients were then added and allowed to mix for an additional period of about five to ten minutes, depending on the how fast a uniform blend is observed.

The second method for melt blending the compositions was by using a Brabender bowl, which is a small internal mixer. The cavity was heated to 120° C. before adding the resins and stabilizer. The blades inside the mixing bowl were rotated at 120 rpm and the ingredients were mixed for about 2 to 3 minutes. The temperature during this stage of mixing was not allowed to exceed 140° C. The rest of the ingredients were then added in, and thoroughly mixed.

The third method of laboratory mixing employed a 2-pound Banbury internal mixer. A similar procedure to that used for the Brabender ball mixing was employed. Good mixing leading to a uniform product was observed using each of the above mixing procedures.

For all these processes, higher temperatures are used when processing resins with a higher melting point than polyethylene. Uniformity of mixing is determined by two methods. The amount of filler in the matrix is determined by measuring percent ash remaining after pyrolysis. A minimum of three samples from each extruded batch are analyzed. Samples are pyrolyzed in a furnace at 800° C. for 10 minutes; the remaining ash is weighed after cooling to room temperature (see ASTM D 1278), and percent ash content is calculated. Ash content is a measure of inorganic filler in the sample that remains after all organics and volatiles are driven off by pyrolysis. Variation in ash content between batches should not exceed +/−3%. Processing conditions used in the lab for proper mixing of the compositions are used to guide large-scale factory mixing of the compositions.

A Buss Kneader extruder with a 70 mm or larger diameter barrel followed by a single screw extruder has been successfully used to produce similar formulations. All ingredients except the reinforcing agent are dry mixed together, placed in a super sack and poured into a hopper. The dry mix is fed from the hopper to the Buss Kneader extruder using a gravimetric feeder to meter in the material at the exact desired rate. The extruder barrel is heated to temperatures ranging from 140-180° C. In the barrel, the polymeric binder melts and the mixing process with the other ingredients begins. Mixing continues as the material travels down the heated barrel. In the Buss Kneader, mixing is performed using a low shear screw. The reinforcing agent, such as glass fibers, is introduced at a later stage using a port closer to the extruder exit in order to preserve the glass fiber from excessive breakage. The polymer melt then exits the Buss Kneader and enters a crosshead single screw extruder to complete the blending process. The blended mixture is then extruded into ribbons by exiting through a multi-strand ribbon die. The ribbons are then cut at the die face into pellets using a rotating knife. The pellets are dropped onto a bed and cooled using air or water before they are dried and conveyed to a container for storage and shipping.

Flammability testing and mechanical properties determination were conducted on samples prepared in the lab. The main function of the intumescent fire retardant polymeric composition is in resisting the spread of flame from a fire source and shielding articles protected by the composition from high temperature rise. The characteristics or property of intumescence efficiency may be measured by a procedure using an apparatus as described in connection with FIG. 1 or by the ASTM E1354 cone calorimeter method.

All of the compositions illustrated in this specification have been tested to assess the fire shielding capabilities of the intumescent fire retardant polymeric compositions, according to the present invention. The standardized test for evaluating and/or verifying fire performance is the ASTM E1354 cone calorimeter test. Another relatively simple test for evaluating fire-shielding capabilities involves exposing plaques made of the intumescent fire retardant polymeric compositions, according to the present invention, to a Bunsen flame for long periods of time. This small scale "Bunsen-burner" test is effective for product development in the laboratory setting. In the "Bunsen-burner" test, flame temperatures are in excess of 1000° C. The sample is considered to pass this test if it continues to provide fire shielding for at least thirty (30) minutes without burn through, or melt dripping. Because the shielding is not compromised, a drastic reduction in temperature on the surface of the sample opposite to the flame is achieved.

A "Bunsen-burner" test apparatus 10 is schematically shown in FIG. 1. The apparatus 10 includes a three-wall steel chamber comprising left side wall 12, back wall 14, and right side wall 16. Each wall is a steel plate 229 mm high, 127 mm wide, and 1 mm thick. The walls are joined at their edges as illustrated in FIG. 1 to form a generally square-shaped (in cross-section) chamber with an open side or front.

A 152 mm by 152 mm by 1 mm thick steel plate adapted to be placed on top of the walls 12, 14, and 16 is employed as a roof member 18. During a test, the roof member 18 carries affixed to its lower surface a molded 127 mm by 152 mm by 2.75 mm rectangular molded slab 20 of material to be tested for intumescence effectiveness as a heat shield. It should be appreciated that the thickness of 2.75 mm of the test specimen (as well as its composition) is important to the repeatability of this test. As illustrated, the slab 20 faces downward inside of the roof member 18 and chamber during the test. On the top surface 22 of the roof member 18 are located six thermocouple leads in the locations indicated, respectively 101, 102, 103, 104, 105, and 106. It should be appreciated that test specimens with other thickness values can also be tested.

A 165 mm tall Bunsen burner 24 is used as the flame or fire source. The height of the burner 24 does not include the flame height. The flame height on top of the burner 24 is on the order of 60 mm, and it is adjusted during each test so that the tip of the inner blue cone of the flame 25, its hottest part, touches the surface of the intumescent material test specimen. A thermocouple indicated at 26 was placed at the lower surface of the slab 20 to measure the flame temperature as it impinged on the intumescent material at that point. The flame temperature as measured by the thermocouple 26 was at a location on the intumescent material opposite the location of the thermocouple 104 on the top surface 22 of the roof member 18.

While six thermocouple locations are indicated in FIG. 1, experience has shown that equivalent useful data is obtained from using only four thermocouples at locations 101, 102, 104, and 106. It should be appreciated that temperature differences between the flame thermocouple and the roof plate thermocouples are used as a measure of the effectiveness of intumescent material in providing thermal and fire shielding.

Aspects of the present invention will now be illustrated, without intending any limitation, by the following examples. Unless otherwise indicated, all parts and percentages are by weight.

EXAMPLES

Table 1 lists a general formulation of a concentrate or fire retardant system of the present invention that may be used alone or may be added to different polymers to make intumescent fire retardant polymers. The components and the amounts of each component have been further described in detail above. Table 1 also lists four exemplary formulations 1-4 in accordance with the present invention.

TABLE 1

| Ingredients | General Formulation | Formulation 1 | Formulation 2 | Formulation 3 | Formulation 4 |
|---|---|---|---|---|---|
| HDPE | 20-45 | 13[1] | 30[2] | 30[3] | 27[3] |
| Polyolefin Copolymer | | 30[4] | 13[5] | 13[4] | 11.7[4] |
| Nitrogenous Gas-Generating Agent | 5-25 | 17[6] | 25[7] | 8[6] | 7.2[6] |
| | | | | 17[7] | 15.3[7] |
| Water Vapor-Generating Agent | 10-35 | 22[8] | 22[8] | 22[8] | 19.8[8] |
| | | 8[9] | | | 10[9] |
| Antioxidant | 1-5 | 1[10] | 1[10] | 1[10] | 0.9[10] |
| | | 1[11] | 1[11] | 1[11] | 0.9[11] |
| Reinforcing Agent | 0-15 | 8[12] | 8[12] | 8[12] | 7.2[12] |
| Total | 100 | 100 | 100 | 100 | 100 |

[1]Fortiflex ® T50-2000 from BP Solvay Polyethylene North America, Houston, TX.
[2]Finathene ® WR 201 from Atofina Petrochemicals, Houston, TX.
[3]Paxon ® BA46-055 from ExxonMobil Chemical Co., Houston, TX.
[4]Exact ® 0210 (ethylene-octene copolymer) from ExxonMobil Chemical Co., Houston, TX.
[5]Exact ® 8210 (ethylene-octene copolymer) from ExxonMobil Chemical Co., Houston, TX.
[6]FR Cros ™ 484 (ammonia polyphosphate) from cfb Budenheim Iberica Comercial, Spain and distributed by Flame Chk, Inc., Medford NJ.
[7]Budit ® 315 (melamine cyanurate) from cfb Budenheim Iberica Comercial, Spain and distributed by Flame Chk, Inc., Medford NJ
[8]Magshield ® (hydrated magnesia) from Martin Marietta Magnesia Specialties, Baltimore, MD.
[9]Graphite 3494 (intercalated graphite) from Asbury Carbons, Inc., Asbury, NJ.
[10]Cyanox ® STDP (distearylthiodipropionate) from Cytec Industries Inc., West Patterson, NJ.
[11]Wingstay ® L (hindered phenol antioxidant) from Eliokem, Akron, OH and distributed by R. T. Vanderbilt Company, Inc., Norwalk, CT.
[12]Glass Fibers from PPG Industries, Pittsburgh, PA.

In Formulation 1, the non-halogen fire retardant additive is an ammonium polyphosphate (FR Cros™ 484, Budenheim). A combination of resins is used as the polymer binder for the intumescent fire retardant ingredients. The first resin is an injection molding grade of HDPE (T50-2000, BP Solvay Polyethylene) having a density of 0.953 g/cm$^3$ (ASTM D4883) and a melt index of 20 g/10 min. at 190° C. under a load of 2.16 kg (ASTM D1238). The second resin used is a linear low density ethylene-α-olefin copolymer (Exact® 0210, ExxonMobil Chemical Co.) that has a density of 0.902 g/cm$^3$, and a melt index of 25 g/10 min. Specifically, Exact® 0210 is an ethylene octene copolymer produced by ExxonMobil using a metallocine single site catalyst. The resin is added to the formulation to improve impact strength.

The hydrated magnesia (Magshield®) and intercalated graphite both emit water vapor at high temperatures, and are added to intumesce the material and to slow down heat release from the polymer material during fire. The antioxidants DSTDP (distearylthiodipropionate) and Wingstay® L (a hindered amine) are added to impart heat stability and improve the aging characteristics of the material.

The above concentrate or system may be added to other polymers at various concentrations to build up a desired degree of fire retardancy for the polymeric material. For example, when the fire retardant formulation is added to an injection molding grade of HDPE (e.g., T50-2000, from BP Solvay) at 30 wt. % level, it imparts fire retardancy by slowing down the horizontal burn rate and preventing flaming melt dripping of the resin, and gives rise to an appreciably decreased amount of heat release when the material is on fire.

The mechanical properties of the fire retardant polymer composition made by mixing 30 wt. % of Formulation 1 with 70 wt. % injection molding grade HDPE (T50-2000) are shown in Table 2. The mechanical properties, although lower than those of the original resin, are still good. The notched Izod impact strength is 0.63 ft-lb/inch, which is close to the 0.77 ft-lb/inch value measured for the virgin HDPE resin without the flame retardant system.

TABLE 2

| PROPERTIES | 70% HDPE[1] + 30% FORMULATION 1 | 70% HDPE[1] + 30% FORMULATION 2 |
|---|---|---|
| Tensile Strength (psi) (ASTM D-638) | 2336 | 2284 |
| Elongation (%) (ASTM D-638) | 17 | 21 |
| Modulus (psi) (ASTM D-638) | 79000 | 88938 |
| Notched Izod Impact Strength (ft-lb/in) (Flow Direction) (ASTM D-256) | 0.63 | 0.66 |
| Horizontal Flame Spread (mm/min) | 22 | 17 |
| Melt Dripping (yes or no) | No | Yes |
| Smoke (high/medium/low) | Low | Low |

[1]Fortiflex ® T50-2000 from BP Solvay Polyethylene North America, Houston, TX.

Figure 2:
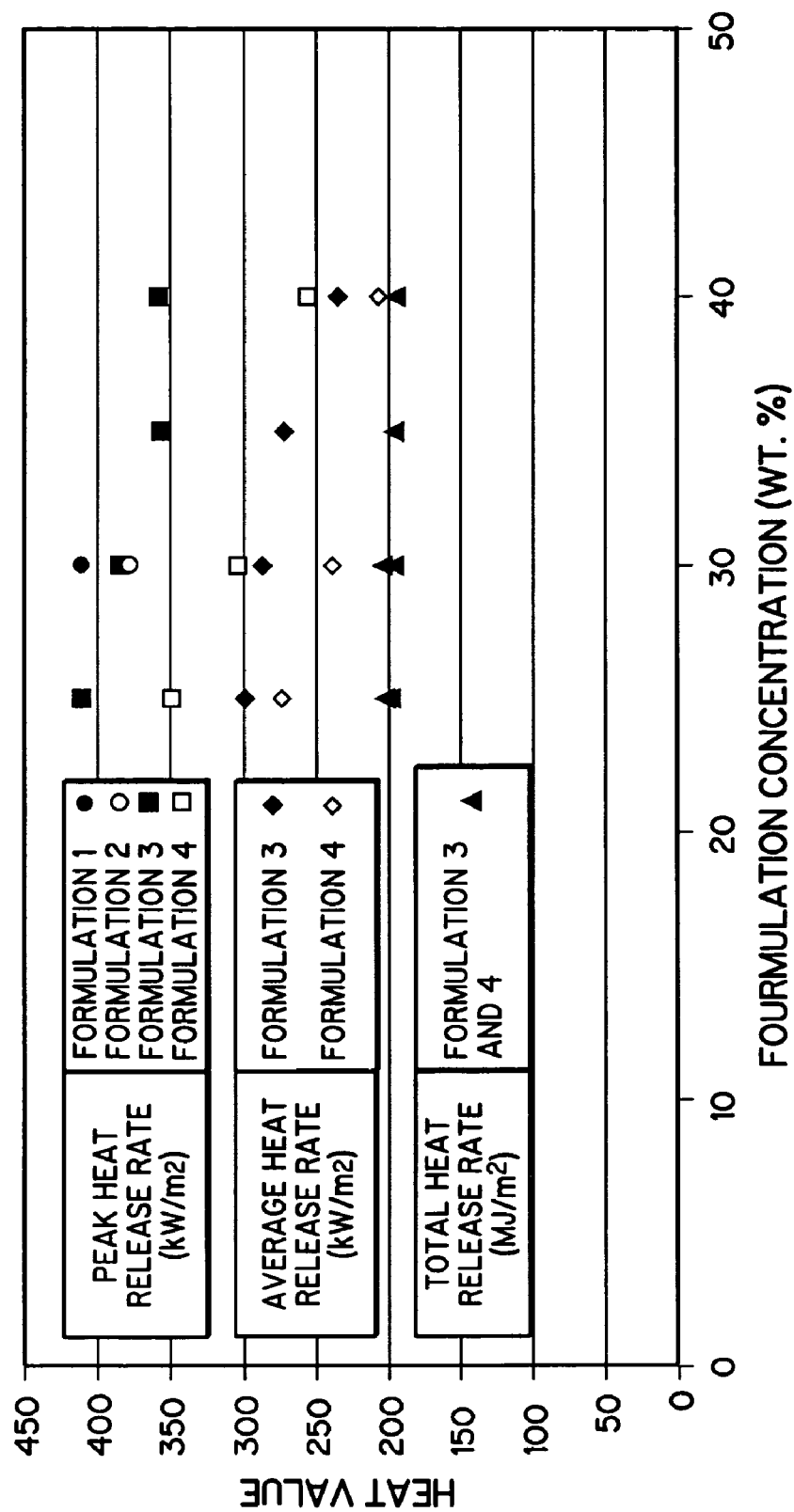
FIG. 2 is a graph depicting the peak heat release rate, the average heat release rate, and the total heat released for various concentrations of the intumescent fire retardant system of the present invention.

The fire retardant polymer made with Formulation 1 burns slowly, does not drip during burning, and hence does not spread fire to neighboring materials. It also generates a low amount of smoke. When the formulation was flame tested using the ASTM E1354 cone calorimeter method, under a heat flux of 35 kW/m$^2$, the peak heat release rate (intumescence efficiency) was 414 kW/m$^2$, as shown in FIG. 2, as compared to 917 kW/m$^2$ for virgin HDPE. The amount of smoke generated during fire was 15 m$^2$ (total smoke) as compared to 8 m$^2$ for virgin polyethylene and much less than the 40 to 82 m$^2$ normally measured for fire retardant polymers.

The fire retardant intumescent Formulation 2, also shown in Table 1, was developed based on melamine cyanurate (BUDIT® 315). Formulation 2 also produces polymers with reduced peak heat release rate. Formulation 2 used a blow molding grade of HDPE in a greater amount than the injection molding grade HDPE in Formulation 1 (30 and 13 parts, respectively). A different grade of linear low density ethylene octene copolymer was used, namely Exact® 8210, in a lesser amount than the grade used in Formulation 1 (13 and 30 parts, respectively). This copolymer is also made by ExxonMobil using the metallocene single site catalyst. The copolymer has elastic and plastic properties, and when added to the intumescent formulation, it enhances impact resistance of the material. The copolymer has a density of 0.882 g/cm$^3$ and a melt index of 10 g/10 min. measured per ASTM D1238.

When 30 wt. % of Formulation 2 is added to 70 wt. % of an injection molding grade of HDPE (T50-2000 from BP Solvay), good mechanical properties are obtained as seen in Table 2 above. The notched Izod impact strength is 0.66 ft-lb/in. The burning characteristics are also good. The horizontal burn test measured per UL 94-HB was only 17 mm/min. Only a slight degree of melt dripping and very low concentration of smoke were observed during fire. The results from the ASTM E1354 cone calorimeter test conducted at 35 kW/m$^2$ are also good. It took 117 seconds to ignite the sample compared to 102 seconds for virgin polyethylene. However, the biggest improvement was for the peak heat release rate, which was measured at 372 kW/m$^2$ (shown in FIG. 2) as compared to 917 kW/m$^2$ for the virgin HDPE. Smoke generation was only 15 m$^2$ (total smoke) compared to values of 40 to 82 m$^2$ measured for other fire retardant polymers.

Formulations 3 and 4 set forth in Table 1 can also be added to HDPE or other polymers to reduce the heat release rate, as shown in FIG. 2. The two formulations were made using identical materials, including a blow molding grade of HDPE, except that Formulation 3 includes 22 parts hydrated magnesia as the sole water vapor-generating agent and Formulation 4 includes a combination of 19.8 parts hydrated magnesia and 10 parts intercalated graphite as the water vapor-generating agent, with the amounts of the other components in the formulation being decreased to accommodate the graphite addition. Addition of either of these fire retardant systems into HDPE appreciably reduces the peak heat release rate from 917 kW/m$^2$ for polyethylene by itself to the values shown in FIG. 2. The heat release rate decreases with increase in the concentration of either formulation in the HDPE. However, the presence of intercalated graphite in Formulation 4 leads to a more prominent decrease in the peak and average rates of heat released. The total heat release rate is essentially the heat of combustion and is essentially the same with and without graphite.

While physical properties are described for a 30 wt. % concentration of the fire retardant system of the present invention in HDPE, it should be understood that fire retardant systems of the present invention, such as Formulations 1-4, may be combined with various polymeric materials and at various ratios to prepare intumescent fire retardant polymers compositions. For example, the fire retardant system of the present invention may be added in an amount of 20-45 wt. % to a polymeric material to provide a balance between physical properties and flammability properties. In addition to polyethylene, the fire retardant system of the present invention may also be added to other thermoplastics such as polypropylene, nylon, polystyrene, styrene-acrylonitrile copolymers, and butadiene-styrene-acrylonitrile terpolymers, or to thermoset polymers such as polyurethanes and epoxies, in order to make non-halogen fire retardant polymeric materials that, in a fire, will intumesce to provide better heat shielding and slow heat release rate. Advantageously, a fire retardant polymeric composition of the present invention has a peak heat release rate of less than 500 kW/m$^2$, as measured by the ASTM E1354 cone calorimeter test, and more advantageously, less than 400 kW/m$^2$.

Polymer compositions made using the fire retardant system of the present invention can be employed in a variety of applications to provide fire safety, including applications for the shipping and warehousing industry, automotive and other transportation industries, and other commercial and residential applications.

While the present invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method and illustrative examples shown and described. Accordingly, departures may be made from such details without departing from the scope or spirit of the general inventive concept.

What is claimed is:

1. An intumescent fire retardant system for use in polymeric moldings, comprising, on the basis of 100 parts by weight blended mixture of a polymer component comprising:
    20-45 parts of a polymeric binder comprising high density polyethylene having a density in the range of 0.940-0.970 g/cm$^3$ and an α-olefin-containing copolymer having a density in the range of 0.870-0.910 g/cm$^3$, wherein the α-olefin-containing copolymer is present in the range of about 1 to 30 parts;
    5-25 parts of a nitrogenous gas-generating agent selected from the group consisting of amines, ureas, guanidines, guanamines, s-triazines, amino acids, salts thereof, and mixtures thereof, wherein the salts are selected from the group consisting of phosphates, phosphonates, phosphinates, borates, cyanurates, sulfates and mixtures thereof;
    10-35 parts of a water vapor-generating agent;
    1-5 parts of an antioxidant; and
    0-15 parts of a reinforcing agent,
    wherein the system is essentially halogen-free.

2. The fire retardant system of claim 1 wherein the α-olefin-containing copolymer is a copolymer of ethylene with one of butene, hexene and octene.

3. The fire retardant system of claim 1 wherein the α-olefin-containing copolymer is a linear low density ethylene octene copolymer.

4. The fire retardant system of claim 1 wherein nitrogenous gas-generating agent is an ammonium salt, a melamine salt, or a mixture thereof.

5. The fire retardant system of claim 1 wherein the nitrogenous gas-generating agent is selected from the group consisting of: melamine phosphates, melamine polyphosphates, melamine pyrophosphates, melamine cyanurates, ammonium phosphates, ammonium polyphosphates, ammonium pyrophosphates, ammonium cyanurates, and mixtures thereof.

6. The fire retardant system of claim 1 wherein the water vapor-generating agent is selected from the group consisting of: hydrated magnesia, hydrated alumina, intercalated graphite, and mixtures thereof.

7. The fire retardant system of claim 1 wherein the antioxidant is selected from the group consisting of: distearylthiodipropionate, a hindered phenol, and mixtures thereof.

8. The fire retardant system of claim 1 wherein the reinforcing agent is selected from the group consisting of: glass fibers, mica, titanium oxide and mixtures thereof.

9. An intumescent fire retardant polymeric moldable composition comprising, on the basis of 100 parts by weight blended mixture:
    55-80 parts of a polymeric matrix; and
    20-45 parts of the intumescent fire retardant system of claim 1.

10. The intumescent fire retardant polymeric composition of claim 9 wherein the polymeric matrix is a thermoplastic polymer selected from the group consisting of: polypropylene, nylon, polystyrene, a styrene-acrylonitrile copolymer, and a butadiene-styrene-acrylonitrile terpolymer.

11. The intumescent fire retardant polymeric composition of claim 9 wherein the polymeric matrix is a thermoset polymer selected from the group consisting of a polyurethane and an epoxy.

12. The intumescent fire retardant polymeric composition of claim 9 wherein the polymeric matrix is a thermoplastic polymer selected from the group consisting of: injection molding grade high density polyethylene, blow molding grade high density polyethylene, and extrusion molding grade high density polyethylene.

13. An intumescent fire retardant system for use in polymeric moldings, comprising, on the basis of 100 parts by weight blended mixture:
    20-45 parts of a polymeric binder comprising high density polyethylene having a density in the range of 0.940-0.970 g/cm$^3$ and an α-olefin-containing copolymer having a density in the range of 0.870-0.910 g/cm$^3$, wherein α-olefin-containing copolymer is present in the range of about 1 to 30 parts;
    15-25 parts of a nitrogenous gas-generating agent selected from the group consisting of an ammonium salt, a melamine salt, or mixtures thereof, wherein the salts are selected from the group consisting of phosphates, phosphonates, phosphinates, borates, cyanurates, sulfates and mixtures thereof;
    20-30 parts of a water vapor-generating agent selected from the group consisting of hydrated magnesia, hydrated alumina, intercalated graphite, and mixtures thereof;
    1-5 parts of an antioxidant selected from the group consisting of distearylthiodipropionate, a hindered phenol, and mixtures thereof; and
    3-10 parts of a reinforcing agent selected from the group consisting of glass fibers, mica, titanium oxide and mixtures thereof,
    wherein the system is essentially halogen-free.

14. The fire retardant system of claim 13 wherein the α-olefin-containing copolymer is a copolymer of ethylene with one of butene, hexene and octene.

15. The fire retardant system of claim 13 wherein the α-olefin-containing copolymer is a linear low density ethylene octene copolymer.

16. The intumescent fire retardant polymeric composition of claim 13 wherein the polymeric matrix is a thermoplastic polymer selected from the group consisting of: polypropylene, nylon, polystyrene, a styrene-acrylonitrile copolymer, and a butadiene-styrene-acrylonitrile terpolymer.

17. The intumescent fire retardant polymeric composition of claim 13 wherein the polymeric matrix is a thermoset polymer selected from the group consisting of a polyurethane and an epoxy.

18. The intumescent fire retardant polymeric composition of claim 13 wherein the polymeric matrix is a thermoplastic polymer selected from the group consisting of: injection molding grade high density polyethylene, blow molding grade high density polyethylene, and extrusion molding grade high density polyethylene.

* * * * *